UNITED STATES PATENT OFFICE.

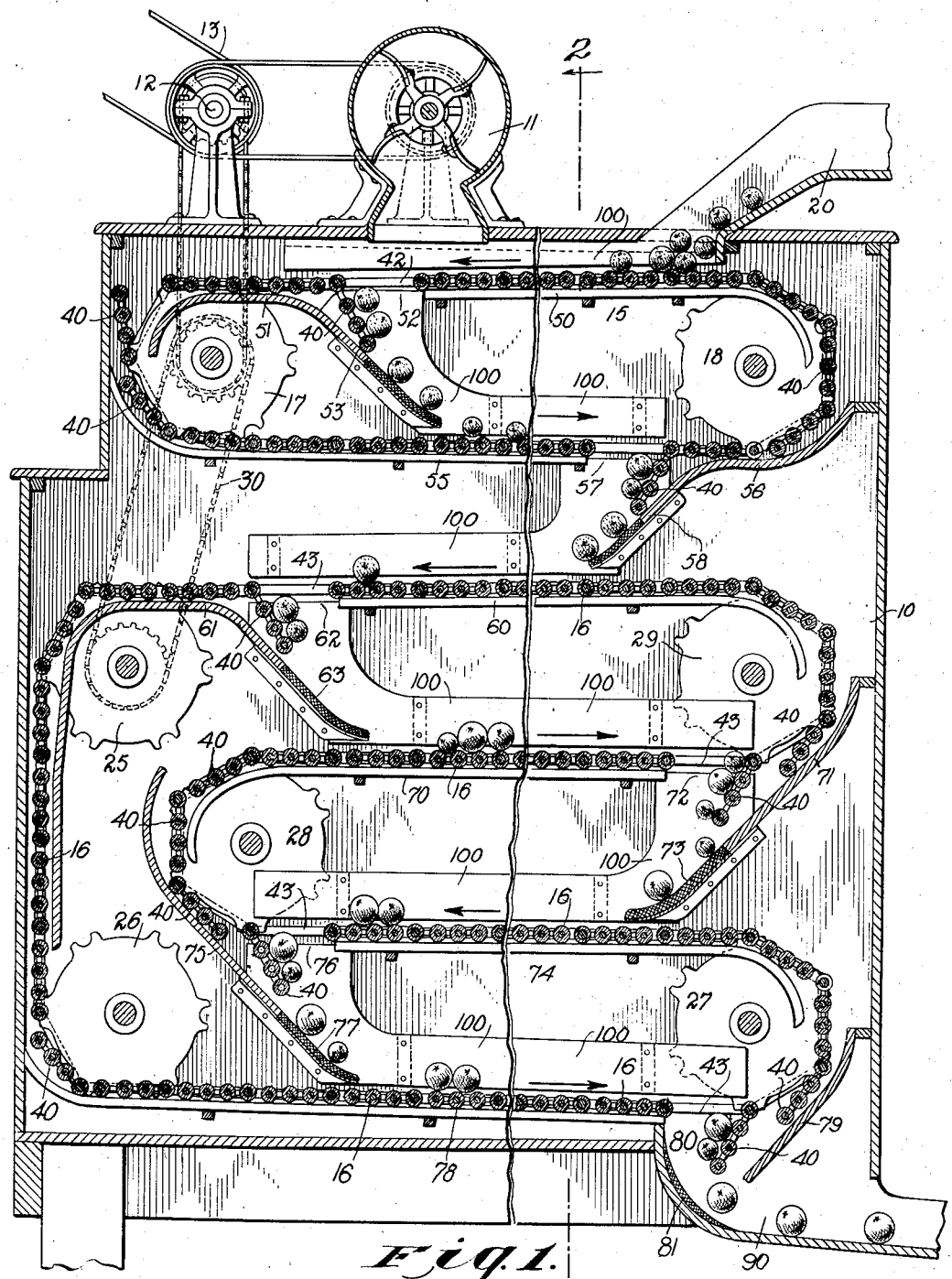

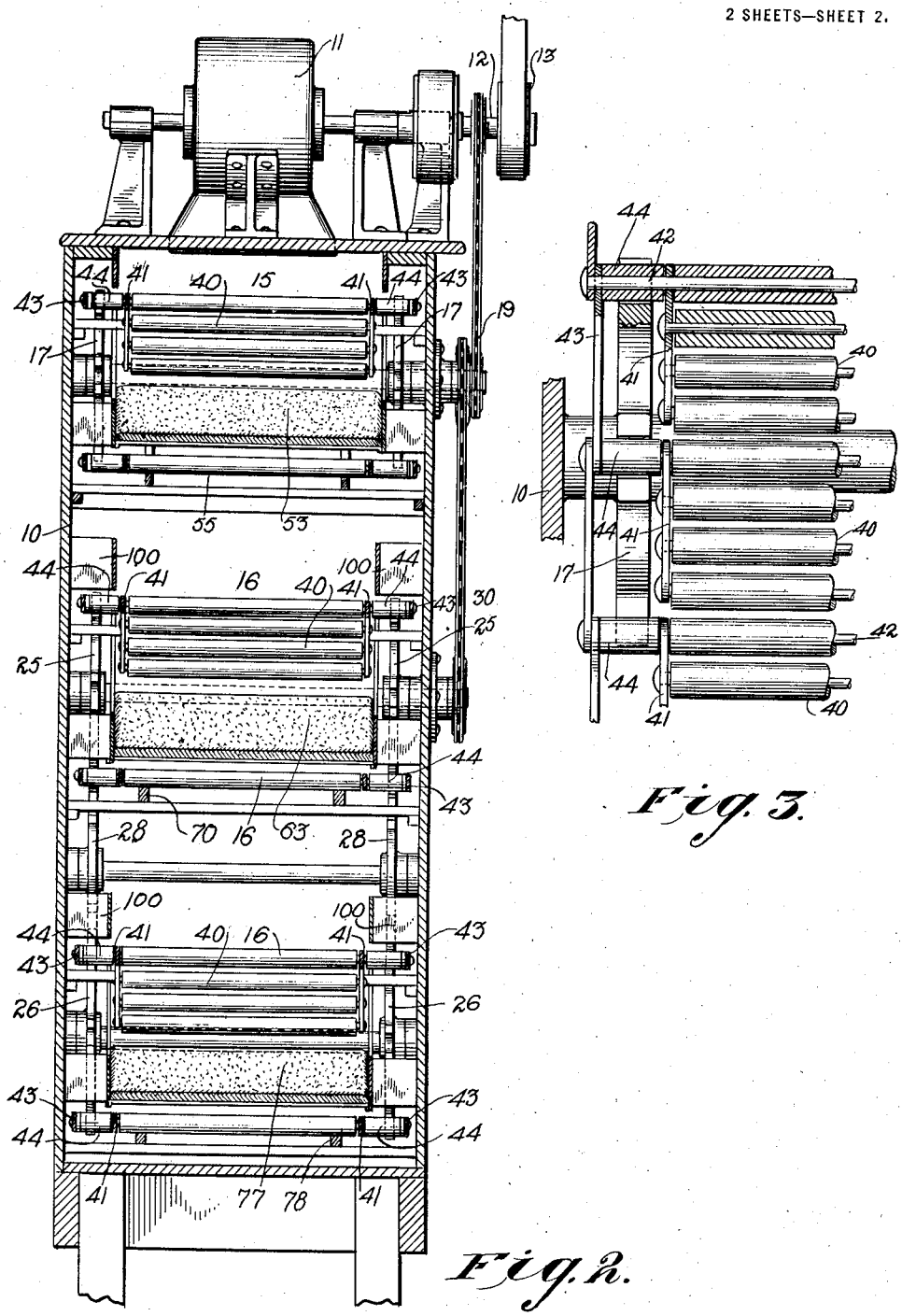

ALLEN H. McINTYRE, OF TAMPA, FLORIDA, ASSIGNOR TO SKINNER MACHINERY CO., OF TAMPA, FLORIDA, A CORPORATION.

FRUIT-DRIER.

1,327,486.      Specification of Letters Patent.      Patented Jan. 6, 1920.

Application filed August 3, 1919. Serial No. 315,397.

*To all whom it may concern:*

Be it known that I, ALLEN H. McINTYRE, a citizen of Canada, and a resident of Tampa, in the county of Hillsborough and State of Florida, have invented a new and Improved Fruit-Drier, of which the following is a full, clear, and exact description.

The invention relates to fruit driers for drying freshly washed citrus fruit prior to wrapping and packing the same, and such, for instance, as shown and described in the Letters Patent of the United States, No. 1,214,234, granted to Lee Bronson Skinner on January 30, 1917.

The object of the invention is to provide a new and improved fruit drier arranged to effectively dry the fruit by subjecting it to a current of air while alternately moving the fruit bodily along for a short distance and then rolling it down an incline, and repeating these alternate actions a number of times for the air to reach every portion of the surface of the fruit. Another object is to move the fruit along without danger of bruising the same. Another object is to provide a fruit drier of exceedingly compact form and capable of handling a large amount of fruit in a given time.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the improved fruit drier;

Fig. 2 is a transverse section of the same on the line 2—2 of Fig. 1; and

Fig. 3 is an enlarged cross section of a portion of one of the conveyers with parts shown in elevation.

The improved fruit drier is mounted on a suitably constructed casing or frame 10 provided on top with a blower 11 or other means for circulating drying air through the casing 10. The blower 11 is driven from a driving shaft 12 connected by pulley and belt or other connecting means 13 with other machinery for rotating the driving shaft 12. Within the casing 10 are arranged conveying means for the fruit, and the conveying means shown in Figs. 1 and 2 consists of two endless conveyers 15 and 16 of the roller or slat type, and located one above the other, the conveyer 15 passing around the wheels 17 and 18 mounted in the casing 10 and of which the wheel 17 is driven from the main shaft 12 by a suitable sprocket wheel and chain connection 19, as indicated in Figs. 1 and 2. This conveyer 15 provides an upper and a lower run, and the fruit to be dried is discharged onto the upper run by a suitable chute 20 arranged on the top of the casing 10. The endless conveyer 16 is provided with four horizontal runs and passes around wheels 25, 26, 27, 28 and 29 journaled in the casing 10 and of which the wheel 25 is the driven one and is for this purpose connected by a sprocket wheel and chain connection 30 with the wheel 17 previously mentioned. When the machine is running air is circulated through the casing 10 by the blower 11 and a similar traveling movement is given to the conveyers 15 and 16.

Each of the conveyer belts 15 and 16 is made in sections, each section comprising a plurality of rollers or slats 40 mounted on links 41 adapted to swing on pivots 42 of endless chains 43, the pivots 42 being provided with rollers 44 adapted to engage the corresponding sprocket wheels 17, 18, 25, 26, 27, 28 and 29 for the latter to impart a traveling motion to the conveyers. The upper run of the upper conveyer 15 is adapted to travel over supports 50, 51 mounted in the casing 10 and spaced apart to provide an opening 52 between the supports 50 and 51 for the sections 40 of the conveyer 15 to swing downward into an inclined or dumping position and onto an incline 53 leading from the rear end of the support 51 in the reverse direction in which the upper run is traveling, the lower end of the incline 53 leading onto the top of the lower run of the conveyer 15. It will be noticed that the fruit discharged by the chute 20 onto the upper run of the conveyer 15 is carried bodily along by the latter until the corresponding section 40 swings down in the opening 52 whereby the fruit is caused to roll off the section and down the incline 53 onto the top of the lower run of the conveyer 15 to be now carried again bodily in a reverse direction. The lower run of the conveyer 15 travels over supports 55, 56 spaced apart to provide an opening 57 for the corresponding section 40 of the conveyer 15 to swing down in and onto an incline 58 extending from the support 56 downwardly and forwardly to deliver the fruit onto the upper run of the lower conveyer 16.

The upper run of the conveyer 16 is mounted to travel on supports 60 and 61, spaced apart to provide an opening 62 between them for the sections 40 to swing down in onto an incline 63 extending from the rear end of the support 61 downwardly and rearwardly and leading to the top of the second run of the conveyer 16. This construction is repeated, that is, the second run passes over supports 70, 71 forming an opening 72 between them and below which is arranged an incline 73 extending downwardly and forwardly from the support 71. The lower end of the incline 73 leads onto the top of the third run of the conveyer 16, and this third run is adapted to pass over supports 74, 75 forming an opening 76 between them, and below this opening 76 is arranged an incline 77 extending from the support 75 downwardly and rearwardly onto the top of the lowermost run of the conveyer 16. The lowermost run 16 passes over supports 78, 79 forming an opening 80 between them, and below this opening is an incline 81 leading into a chute 90 for carrying fruit from the machine. It will be noticed that by the arrangement described the fruit is bodily carried for a short distance on the runs of the conveyers 15 and 16, is then allowed to roll downward onto the next following run to be carried bodily along to the next opening, and during this bodily and rolling movement of the fruit the latter is subjected to the drying action of the air which latter thus reaches every particle of the surface of the fruit to thoroughly dry the same by the time it reaches the chute 90. The supports 50, 55, 60, 70, 74 and 78 are preferably in the form of longitudinally extending slats to permit free passage of the drying air. The supports 51, 56, 61, 71, 75 and 79 and the inclines 53, 58, 63, 73, 77 and 81 are preferably made solid. Suitable guard rails 100 are attached to the sides of the casing and are arranged at the sides to prevent the fruit from falling off sidewise from the conveyers and inclines. The inclines 53, 58, 63, 73, 77 and 81 are preferably padded to prevent bruising of the fruit during the time the fruit rolls down the incline, as above explained.

It will be noticed that the drier is in exceedingly compact form and is capable of handling a large amount of fruit in a given time, and the fruit is caused to travel a considerable distance and is constantly subjected to the drying action of the air to effectively dry the fruit.

Having thus described my invention, I claim as new and desire to secure by Letters Patent:—

1. In a fruit drying machine, an endless traveling conveyer made in sections, and spaced sectional supporting means for the said conveyer to support the conveyer sections during a portion of the travel of the conveyer in supporting position for the fruit and to allow the conveyer sections to move into dumping position during another portion of the travel of the conveyer for the fruit to roll off.

2. In a fruit drying machine, an endless conveyer made in sections, supports spaced apart and adapted to support the conveyer during its passage over the supports, the conveyer sections being adapted to swing downward in the opening between the ends of adjacent supports, and an incline below the said opening.

3. In a fruit drying machine, an endless conveyer made in sections, supports spaced apart and adapted to support the conveyer during its passage over the supports, the conveyer sections being adapted to swing downward in the opening between the ends of adjacent supports, and an incline below the said opening and extending in the reverse direction of the travel of the conveyer run passing over the adjacent supports, the said incline leading to another run of the conveyer.

4. In a fruit drying machine, an endless conveyer having at least two horizontally extending runs, the conveyer being made in sections adapted to swing from horizontal into inclined position, supports for the runs of the said conveyer and spaced apart to provide openings between adjacent supports for the conveyer sections to swing down, and inclines extending downward and rearward from the rear ends of the said supports and leading to a conveyer run next below.

5. In a fruit drying machine, an endless conveyer having at least two horizontally extending runs, the conveyer being made in sections adapted to swing from horizontal into inclined position, supports for the runs of the said conveyer and spaced apart to provide openings between adjacent supports for the conveyer sections to swing down, inclines extending downward and rearward from the rear ends of the said supports and leading to a conveyer run next below, and means for subjecting the fruit to the drying action of air while being bodily moved by the supported conveyer sections and while rolling down the unsupported conveyer sections and the inclines.

ALLEN H. McINTYRE.